United States Patent [19]
Kroll

[11] Patent Number: 5,761,019
[45] Date of Patent: Jun. 2, 1998

[54] MEDICAL CURRENT LIMITER

[75] Inventor: Mark W. Kroll, Simi Valley, Calif.

[73] Assignee: L.Vad Technology, Inc., Detroit, Mich.

[21] Appl. No.: 585,358

[22] Filed: Jan. 11, 1996

[51] Int. Cl.⁶ ..................................................... H02H 9/00
[52] U.S. Cl. ........................... 361/58; 361/93; 128/908
[58] Field of Search ............................... 361/18, 58, 59, 361/91, 93, 98, 100, 101; 128/696, 908; 323/908, 911; 327/328, 581

[56] References Cited

U.S. PATENT DOCUMENTS

| | | | |
|---|---|---|---|
| 3,521,087 | 7/1970 | Lombardi | 327/322 |
| 3,603,811 | 9/1971 | Day et al. | 327/328 |
| 3,605,728 | 9/1971 | Ogle | 128/696 |
| 3,636,385 | 1/1972 | Koepp | 361/56 |
| 3,656,025 | 4/1972 | Roveti | 361/58 |
| 3,748,569 | 7/1973 | Frank et al. | 323/278 |
| 3,939,962 | 2/1976 | Gebhardt | 198/781.08 |
| 4,013,925 | 3/1977 | Tice et al. | 361/91 |
| 4,200,898 | 4/1980 | Thompson | 361/58 |
| 4,533,970 | 8/1985 | Brown | 361/58 |
| 4,546,401 | 10/1985 | Svedberg | 361/91 |
| 4,580,063 | 4/1986 | Torelli et al. | 361/91 |
| 4,595,941 | 6/1986 | Avery | 361/91 |
| 4,631,567 | 12/1986 | Kokado et al. | 257/111 |
| 4,744,369 | 5/1988 | Kroll | 128/696 |
| 4,745,923 | 5/1988 | Winstrom | 128/908 |
| 4,811,156 | 3/1989 | Kroll | 361/91 |
| 5,006,734 | 4/1991 | Engelbrecht | 327/322 |
| 5,087,871 | 2/1992 | Losel | 361/91 |

Primary Examiner—Ronald W. Leja
Attorney, Agent, or Firm—Young & Basile, PC

[57] ABSTRACT

A medical current limiter protects medical electrodes and associated diagnostic apparatus from overcurrents. The medical current limiter includes first and second external terminal connections and first and second cascade circuits, each formed of a pair of n-channel field effect transistors and a p-channel field effect transistor consecutively connected in series between one of the first and second external terminals and a low value resistor. The p-channel field effect transistor and one of the n-channel field effect transistors connected thereto in each cascade circuit have a pinch-off voltage of less than 0.7 volts.

11 Claims, 1 Drawing Sheet

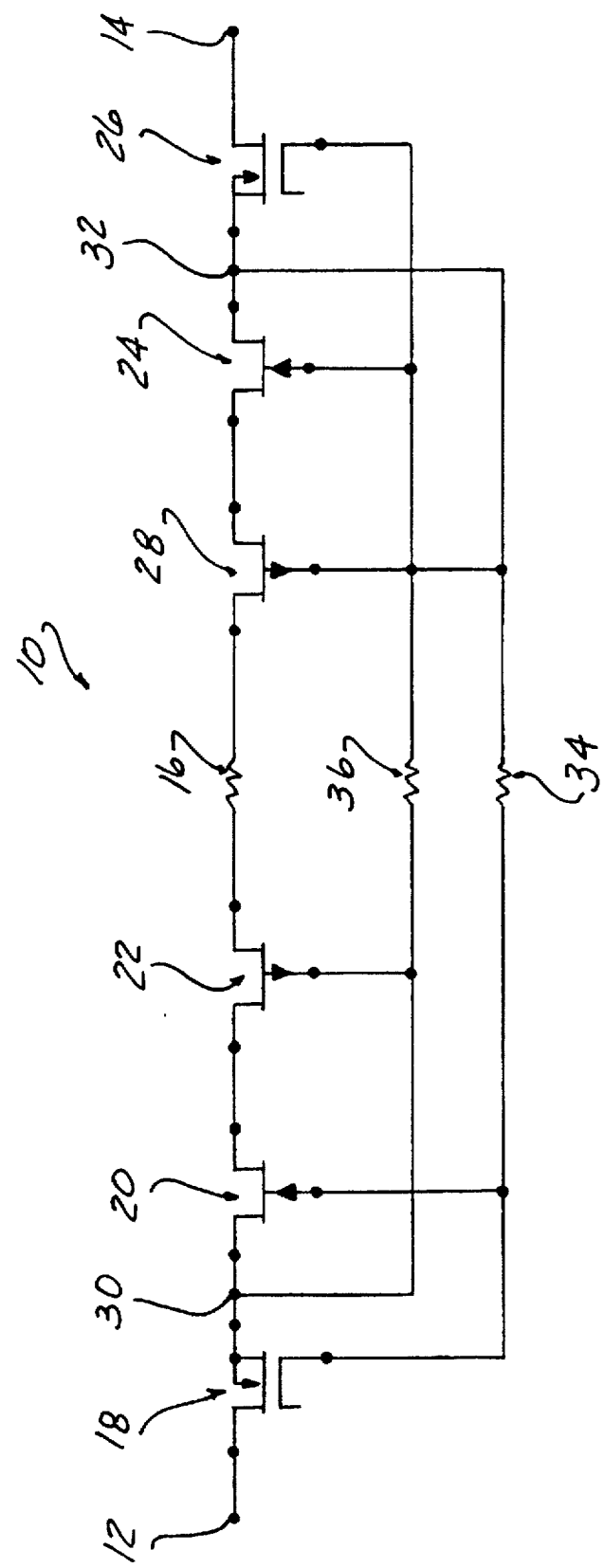

ic current limiter for use with an external electrical
MEDICAL CURRENT LIMITER

BACKGROUND OF THE INVENTION

1. Field Of The Invention

The present invention relates to current limiting devices and, specifically, to a medical current limiting device. More specifically, the present invention relates to medical current limiting devices which are usable with percutaneous access devices employed to establish a connection through the skin between an organ or device implanted within the human body and an external device, such as a monitor, pump or the like.

2. Background Description

A variety of devices or circuits have been devised to limited electrical currents. One classical method utilizes a large ohm resistor in series with the current source and the load. However, the use of large ohm resistors creates undesirable noise which interferes with subsequent signal analysis.

Another prior art device utilizes a pair of field effect transmitters (FETs) which are connected in series with a small resistor. However, this device is ineffective at limiting currents to desired medically safe levels, such as under 20 micro-amps, without the use of large resistors. Another problem with this device is that upon sensing a current overload, the device limits current to a fixed maximum value which is independent of the applied voltage as opposed to dropping the current to a very low level, such as under 4 micro-amps for example.

Another current limiter device utilizes a pair of n-type FETs (n-FETs) in series with a p-type FET connected in between the n-type FETs. This device is typically used in computers and the p-FET is controlled by an external voltage connected to a gate and thus acts as a voltage controlled variable resistor. The requirement of an external control voltage renders this device unusable in medical applications.

Another type of medical current limiter has been proposed by the present inventor and is disclosed in U.S. Pat. Nos. 4,744,369 and 4,811,156. In this current limiter, a pair of n-type field effect transistors and a p-type field effect transmitter are connected in series with a resistor and one external terminal. An additional series arrangement of a pair of n-type field effect transistors and a p-type field effect transistor are connected between the opposite side of the resistor and another external terminal. A capacitor is provided to latch each p-FET in a non-conductive state upon its initial activation. A diode is also provided to prevent capacitor discharge to the current source. While these latter described current limiters provide a low current, such current limiters are prone to low frequency oscillation. Further, the capacitors used in these current limiters are difficult to be made in a compact form or in an integrated circuit.

Despite the availability of various current limiting devices, it would still be desirable to provide a current limiting device which is inexpensive and formed without capacitors for a compact construction so as to be easily usable in medical applications. It would also be desirable to provide a current limiting device which limits current flow to a very low current level upon detection of a current overload.

SUMMARY OF THE INVENTION

The present invention is a two terminal bi-directional medial current limiter for use with an external electrical power source and an electrical device connected to first and second external terminals.

The medical current limiter includes a voltage dropping sensing means connected between the first and second external terminals. First and second n-channel field effect transistors and a first p-channel field effect transistor are connected in series between the first external terminal and the voltage dropping sensing means. A second p-channel field effect transistor and third and fourth n-channel field effect transistors are connected in series between the voltage dropping sensing means and the second external terminal. A gate electrode of the first p-channel field effect transistor is connected to the first external terminal through the first n-channel field effect transistor. The gate of the second p-channel field effect transistor is connected to the second external terminal through the fourth n-channel field effect transistor.

In a preferred embodiment, a plurality of the n-channel and p-channel field effect transistors are insulated gate field effect transistors operating in a completion mode. Preferably, the first and fourth n-channel field effect transistors are insulated gate field effect transistors operating in a depletion mode.

In an exemplary embodiment, the medical current limiter includes first, second, third and fourth n-channel field effect transistors connected consecutively in series between the first and second external terminals. Each first, second, third and fourth n-channel field effect transistor has a gate, a source and a drain terminal. The drain terminals of the first and fourth n-channel field effect transistors are connected to the first external terminal and the second external terminal, respectively. The drain terminals of the second and third n-channel field effect transistors are connected to the source terminals of the first and fourth n-channel field effect transistors, respectively. The gate terminals of the first and second n-channel field effect transistors are connected to the second external terminal through a resistor and the fourth n-channel field effect transistor. The gate terminals of the third and fourth n-channel field effect transistors are connected to the first external terminal through a resistor and the first n-channel field effect transistor.

First and second p-channel field effect transistors are connected in series between the second and third n-channel field effect transistors. Each of the first and second p-channel field effect transistors has a gate, a source and a drain terminal. The drain terminal of the first p-channel field effect transistor is connected to the source terminal of the second n-channel field effect transistor. The drain terminal of the second p-channel field effect transistor is connected to the source terminal of the third n-channel field effect transistor. The gate terminal of the first p-channel field effect transistor is connected to the first external terminal through the first n-channel field effect transistor. The gate terminal of the second p-channel field effect transistor is connected to the second external terminal through the fourth n-channel field effect transistor.

Finally, a low resistance, voltage dropping sensing means is connected between the first and second p-channel field effect transistors.

The first and second p-channel field effect transistors and, preferably, also the second and third n-channel field effect transistors have a pinch-off voltage of less than 0.7 volts.

The n-FETs sense voltage drops that result from excess current passing through the low resistance voltage dropping sensing means. The n-FETs switch off to limit current to a low idle level. Further, the n-FETs are arranged in a series or cascade arrangement to provide positive feedback to speed switch off of the n-FETs. The p-FETs are provided to quickly sense positive voltage at the external terminals without relying on intra-network voltage drops.

The medical current limiter of the present invention includes two symmetrically arranged pairs of n-FETs and a p-FET to provide bi-directional current limiting capabilities. The medical current limiter of the present invention provides an inexpensive, compact, fail safe device to protect a patient from overcurrent. The medical current limiter also provides such current limiting capabilities without the use of a large series resistance which has hereto introduced undesirable noise and distortion or the use of capacitors which have hindered the construction of prior current limiters in a small compact form suitable for medical use. The present medical current limiter shuts off current flow to a very low level.

BRIEF DESCRIPTION OF THE DRAWING

The various features, advantages and uses of the present invention will become more apparent by referring to the following detailed description and drawing which is a circuit diagram of a medical current limiter device constructed in accordance with the teachings of the present invention.

DESCRIPTION OF THE PREFERRED EMBODIMENT

The drawing illustrates a medical current limiter 10 constructed in accordance with the teachings of the present invention. The current limiter 10 is mounted on a suitable circuit board, not shown, which is in turn mounted within a housing, also not shown. The housing can be a part of a percutaneous device which is implanted within a human body to establish a connection through the skin between an organ or device implanted within the body and an external device, such as a monitor, pump or the like. The current limiter 10 is designed for bi-directional current limiting, such as in a.c. current applications. It will also be understood that the present current limiter can be modified to provide current limiting in only a single direction.

The current limiter 10 includes first and second exterior terminals 12 and 14 which provide connections to an external device, such as a monitor, pump or the like, and an internal organ in a user's body.

The current limiter 10 includes a voltage dropping sensing means, such as a resistor 16. Preferably, the resistor 16 has a resistance of less than or equal to approximately 30K ohms and, preferably a resistance of less than or equal to approximately 25K ohms so as not to add appreciable noise or interference to the current limiter circuit 10. The resistor 16 may also be a variable resistor.

A first series or cascade circuit is formed of a first n-type field effect transistor (hereafter "n-FET") 18, a second n-FET 20 and a first p-FET 22. A second series or cascade connection is formed of a third n-FET 24, a fourth n-FET 26 and a second p-FET 28. Each n-FET and p-FET has gate, source and drain terminals or electrodes. Further, each of the n-FETs 20 and 24 and each of the p-FETs 22 and 28 are junction-type field effect transistors which operate in a depletion mode. The n-FETs 18 and 26 are insulated gate field effect transistors which operate in a depletion mode.

The first and second p-FETs 28 and 22 and, preferably, also the second and third n-FETs 20 and 24 must have a pinch-off voltage (Vp) of less than 0.7 volts for proper operation of the current limiter 10 with the low resistance sensing resistor 16 described above. When the FETs 20, 24, 28 and 22 have pinch-off voltages (Up) greater than 0.7 volts, the resistance of the sensing resistor 16 would have to be greater than 50K ohms which could adversely effect the performance of the current limiter 10. By way of example only, the second and third n-FETs are 2N4117A field effect transistors sold by Siliconix or Solitron. Further, by way of example, the first and second p-FETs 28 and 22 are 2N5020 field effect transistors sold by Solitron.

Although the second and third n-FETs 20 and 24 and the first and second p-FETs 22 and 28 have a nominal range for pinch-off voltage or Vp which covers 0.7 volts, in order to ensure that the Vp for each of these field effect transistors is less than 0.7 volts, initial screening or testing of these field effect transistors may have to be performed to ensure that such field effect transistors employed in the current limiter 10 have the desired pinch-off voltage of less than 0.7 V.

As shown in the drawing, the various components of the current limiter 10 are interconnected in the following manner. The drain electrode of the first n-FET 18 is connected to the first external terminal 12. The source electrode of the first n-FET is connected through a node 30 to the drain electrode of the second n-FET 20. The source electrode of the second n-FET 20 is connected to the drain electrode of the first p-FET 22. The source electrode of the first p-FET 22 is connected to one side of the resistor 16. The other side of the resistor 16 is connected to the source electrode of the second p-FET 28. The drain electrode of the second p-FET 28 is connected to the source electrode of the third n-FET 24. The drain electrode of the third n-FET 24 is connected through a node 32 to the source electrode of the fourth n-FET 26. The drain electrode of the fourth n-FET 26 is connected to the second external terminal 14.

The gates of the first and second n-FETs 18 and 20 are connected through a resistor 34, which preferably has a 1M ohm value, to the node 32 between the drain electrode of the third n-FET 24 and the source electrode of the fourth n-FET 26. The gate of the second p-FET 28 is connected to the node 30.

The gates of the third and fourth n-FETs 24 and 26 are connected through a resistor 36, also preferably having a 1M ohm value, to the node 30 between the source electrode of the first n-FET 18 and the drain electrode of the second n-FET 20. The gate of the second p-FET 28 is also connected to the node 32. The resistors 34 and 36 are provided to protect the gates of the field effect transistors from voltage breakdown.

The current limiter 10 functions to limit current flow to a very low idle current upon detection of large voltage drops associated with high current flow or current overload. Assuming a positive high voltage is applied to the first external terminal 12, an increase in current will produce a voltage drop across the resistor 16. The negative voltage from this voltage drop, relative to the source of the second n-FET 20, is sensed by the gate of the second n-FET 20. The conduction channel of the second n-FET 20 is thereby depleted and current flow is restricted to a small leakage current which holds the gate negative.

The depletion of the second n-FET 20 increases its resistance which further drops the voltage relative to the source of the first n-FET 18. This further voltage drop is sensed by the gate of the first n-FET 18 which activates and depletes its channel thereby further limiting current flow to a small, gate activating, leakage current. The interaction of the first and second n-FETs 18 and 20, along with the resistor 16, causes a cascading effect which increases the responsiveness of the current limiter circuit 10 to limit overall current levels.

The gates of the first and second n-FETs 18 and 20 are connected through the resistor 34 to the node 32 which is isolated from the second external terminal 14 by the fourth n-FET 26 to gain as much potential difference for the gate terminals relative to their respective source terminals as possible.

The effect of the turn-off or depletion of the first and second n-FETs 18 and 20 allows the voltage at the node 30 to rise. A positive voltage at the node 30 routes to the gate of the first p-FET 22 which depletes the first p-FET 22 channel to further limit current flow. The depletion of the first p-FET 22 further increases the voltage drop sensed by the gates of the first and second n-FETs 18 and 20 which results in further depletion of the first p-FET 22. This positive feedback lowers the current to a very low idling level, such as, for example, 4 micro-amps, even with high applied voltages.

The third and fourth n-FETs 24 and 26 and the second p-FET 28 operate in the same manner to limit current flow in an opposite direction through the current limiter 10 when a positive voltage is applied to the second external terminal 14. The third and fourth n-FETs 24 and 26 sense voltage drops in the current limiter 10 associated with high current flow from the second external terminal 14 and limit current by the above-described cascade mechanism. Positive voltage at the node 32 depletes the gate of the second p-FET 28 as described above.

In summary, there has been disclosed a unique current limiter which provides a simple and inexpensive means for limiting current flow in medical devices in a bi-directional manner. The present current limiter is constructed without capacitors thereby enabling it to be constructed in a small, compact form, such as an integrated circuit.

What is claimed is:

1. A two terminal bi-directional medical current limiter for use with an external electrical power source and an electrical device connected to first and second external terminals, the medical current limiter comprising:

voltage dropping sensing means connected between the first and second external terminals for sensing a voltage drop between the first and second external terminals;

first and second n-channel field effect transistors and a first p-channel field effect transistor connected in series, respectively, between the first external terminal and the voltage dropping sensing means;

a second p-channel field effect transistor and third and fourth n-channel field effect transistors connected in series, respectively, between the voltage dropping sensing means and the second external terminal;

the first and fourth n-channel field effect transistors being insulated gate field effect transistors operating in a depletion mode;

a gate electrode of the first p-channel field effect transistor connected to the first external terminal through the first n-channel field effect transistor and to the second external terminal through the fourth n-channel field effect transistor; and a gate of the second p-channel field effect transistor connected to the second external terminal through the fourth n-channel field effect transistor and to the first external terminal through the first n-channel field effect transistor.

2. The medical current limiter of claim 1 wherein:

the first and second p-channel field effect transistors have a pinch-off voltage of less than 0.7 volts.

3. The medical current limiter of claim 2 wherein:

the second and third n-channel field effect transistors have a pinch-off voltage of less than 0.7 volts.

4. The two terminal medical current limiter of claim 3 wherein:

the first and second p-channel field effect transistors and the second and third n-channel field effect transistors being junction-type field effect transistors operating in a depletion mode.

5. The medical current limiter of claim 1 wherein:

the second and third n-channel field effect transistors have a pinch-off voltage of less than 0.7 volts.

6. The medical current limiter of claim 1 wherein:

the voltage dropping sensing means has a resistance of less than or equal to 30K ohms.

7. The medical current limiter of claim 1 wherein:

the voltage dropping sensing means has a resistance of less than or equal to 25K ohms.

8. The medical current limiter of claim 1 wherein:

the first and second p-channel field effect transistors are junction-type field effect transistors operating in a depletion mode.

9. The medical current limiter of claim 1 wherein:

the second and third n-channel field effect transistors are junction-type field effect transistors operating in a depletion mode.

10. A two terminal bi-directional medical current limiter for use with an external electrical power source and an electrical device connected to first and second external terminals, the medical current limiter comprising:

first, second, third and fourth n-channel field effect transistors connected consecutively in series between the first and second external terminals, the first and fourth n-channel field effect-transistors being insulated gate field effect transistors operating in a depletion mode, each first, second, third and fourth n-channel field effect transistor having a gate, a source and a drain terminal, the drain terminals of the first and fourth n-channel field effect transistors connected to the first external terminal and the second external terminal, respectively, the drain terminals of the second and third n-channel field effect transistors connected to the source terminals of the first and fourth n-channel field effect transistors, respectively, the gate terminals of the first and second n-channel field effect transistors connected to the second external terminal through the fourth n-channel field effect transistor, the gate terminals of the third and fourth n-channel field effect transistors connected to the first external terminal through the first n-channel field effect transistor;

first and second p-channel field effect transistors connected in series between the second and third n-channel field effect transistors, each of the first and second p-channel field effect transistors having a gate, a source and a drain terminal, the drain terminal of the first p-channel field effect transistor connected to the source terminal of the second n-channel field effect transistor, the drain terminal of the second p-channel field effect transistor connected to the source terminal of the third n-channel field effect transistor, the gate terminal of the first p-channel field effect transistor connected to the first external terminal through the first n-channel field effect transistor and to the second external terminal through the fourth n-channel field effect transistor, the gate terminal of the second p-channel field effect transistor being connected to the second external terminal through the fourth n-channel field effect transistor and to the first external terminal through the first n-channel field effect transistor; and a low resistance means connected between the first and second p-channel field effect transistors.

11. The medical current limiter of claim 10 wherein:

the first and second p-channel field effect transistors and the second and third n-channel field effect transistors being junction-type field effect transistors operating in a depletion mode;

the first and second p-channel field effect transistors and the second and third n-channel field effect transistors having a pinch-off voltage of less than 0.7 volts.

* * * * *